US 12,113,428 B2

(12) United States Patent
Liu et al.

(10) Patent No.: US 12,113,428 B2
(45) Date of Patent: Oct. 8, 2024

(54) REGULATOR CIRCUIT

(71) Applicant: Renesas Design (UK) Limited, Bourne End (GB)

(72) Inventors: Youzhong Liu, Tianjin (CN); Yanzhao Wang, Tianjin (CN); Yanjun Li, Tianjin (CN); Yixuan Ma, Tianjin (CN)

(73) Assignee: Renesas Design (UK) Limited, Bourne End (GB)

( * ) Notice: Subject to any disclaimer, the term of this patent is extended or adjusted under 35 U.S.C. 154(b) by 0 days.

(21) Appl. No.: 18/688,631

(22) PCT Filed: Dec. 6, 2022

(86) PCT No.: PCT/CN2022/136769
§ 371 (c)(1),
(2) Date: Mar. 1, 2024

(87) PCT Pub. No.: WO2024/119349
PCT Pub. Date: Jun. 13, 2024

(65) Prior Publication Data
US 2024/0275260 A1 Aug. 15, 2024

(51) Int. Cl.
*H02M 1/00* (2007.01)
*H02M 3/158* (2006.01)

(52) U.S. Cl.
CPC ....... *H02M 1/0019* (2021.05); *H02M 1/0045* (2021.05); *H02M 3/158* (2013.01)

(58) Field of Classification Search
CPC ... H02M 1/0019; H02M 1/0045; H02M 3/158
See application file for complete search history.

(56) References Cited

U.S. PATENT DOCUMENTS 7,148,632 B2 * 12/2006 Berman ................. H05B 45/22
362/800
7,321,222 B2    1/2008 Hojo
(Continued)

FOREIGN PATENT DOCUMENTS

CN      1918777 A    2/2007
CN    102057573 B   11/2013
(Continued)

OTHER PUBLICATIONS

International Search Report and Written Opinion dated Aug. 16, 2023 issued in PCT/CN2022/136769.

*Primary Examiner* — Rafael O De Leon Domenech
(74) *Attorney, Agent, or Firm* — SCULLY, SCOTT, MURPHY & PRESSER, P.C.

(57) ABSTRACT

A regulator circuit is presented. The regulation circuit (530) has a regulation switch (131), a voltage comparator (537) with predetermined offset voltage and an adjuster. The regulation switch (131) has a first terminal coupled to a current source (132), a second terminal connectable to a load (110), and a control terminal. The voltage comparator (537) compares a sum voltage of the offset voltage added to a voltage at the second terminal with a control voltage at the control terminal, and generates a comparison signal. The adjuster adjusts the voltage at the second terminal based on the comparison signal to control a difference voltage between the control terminal and the second terminal of the regulation switch and to maintain the regulation switch operating in a desired region of operation.

19 Claims, 13 Drawing Sheets

(56) References Cited

U.S. PATENT DOCUMENTS

| | | |
|---|---|---|
| 7,928,670 B2 | 4/2011 | Chen et al. |
| 8,295,021 B2 | 10/2012 | Ohshima |
| 8,710,752 B2 | 4/2014 | Jin et al. |
| 11,449,085 B2 | 9/2022 | Yasusaka et al. |
| 11,626,802 B2 | 4/2023 | Shiina |
| 2008/0231244 A1* | 9/2008 | Yamada .................. H02M 1/32 323/282 |
| 2014/0225508 A1 | 8/2014 | Pauritsch et al. |
| 2015/0115814 A1 | 4/2015 | Huang et al. |
| 2015/0145489 A1* | 5/2015 | Hou .................... H03K 5/1536 327/79 |

FOREIGN PATENT DOCUMENTS

| | | |
|---|---|---|
| CN | 114123771 A | 3/2022 |
| CN | 113168198 B | 9/2022 |
| JP | 2000341096 A | 12/2000 |

\* cited by examiner

REGULATOR CIRCUIT

TECHNICAL FIELD

The present disclosure relates to a regulator circuit and a method for operating a regulation switch. In particular, the disclosure relates to a regulator circuit for maintaining a regulation switch in a desired region of operation. The regulator circuit may be used for driving a load such as a semiconductor light source.

BACKGROUND

Semiconductor light sources such as LEDs require a dedicated driver for controlling an amount of current flowing through the LED string or array of LEDs. A regulation switch is usually provided to regulate the LED current.

Several LED drivers have been proposed as described in U.S. Pat. No. 7,928,670 titled "LED Driver with multiple feedback loops", US2014/0225508 titled "Driver assembly and method for detecting and error condition of a lighting unit", and U.S. Patent 2014/0225508, and U.S. Pat. No. 8,710,752 titled "Adaptive switch mode LED system". Existing drivers are limited by a relatively poor efficiency when either when the LED current or the temperature are varying.

It is an object of the disclosure to address one or more of the above mentioned limitations.

SUMMARY

According to a first aspect of the disclosure there is provided a regulator circuit comprising a regulation switch having a first terminal coupled to a current source, a second terminal connectable to a load, and a control terminal; a voltage comparator comprising a predetermined offset voltage, the voltage comparator being adapted to compare a sum voltage of the offset voltage added to a voltage at the second terminal with a control voltage at the control terminal, and to generate a comparison signal; and an adjuster adapted to adjust the voltage at the second terminal based on the comparison signal to control a difference voltage between the control terminal and the second terminal of the regulation switch and to maintain the regulation switch operating in a desired region of operation.

For instance, the first terminal of the regulation switch may be a source terminal, the second terminal a drain terminal, and the control terminal a gate terminal. For instance, the regulation switch may be a N-type transistor such as N-MOSFET transistor.

Optionally, the predetermined offset voltage is adjustable. For instance, the regulator circuit may comprise an offset voltage adjuster configured to adjust the predetermined offset voltage.

Optionally, the predetermined offset voltage is equal or substantially equal to a threshold voltage of the regulation switch to operate the regulation switch between a linear region and a saturation region, or the predetermined offset voltage is greater than the threshold voltage of the regulation switch to operate the regulation switch in the linear region or the predetermined offset voltage is lower than the threshold voltage of the regulation switch to operate the regulation switch in the saturation region.

Optionally, the difference voltage is substantially equal to the offset voltage. For instance, the difference voltage may be equal or substantially equal to the threshold voltage of the regulation switch. Setting the offset voltage substantially equal to the threshold voltage of the regulation switch provides a good compromise between power efficiency and transient line regulation.

Optionally, the load has an input terminal for receiving an input voltage from a power supply and an output terminal coupled to the regulation switch; and wherein the adjuster is adapted to adjust the voltage at the second terminal by varying the input voltage.

Optionally, the adjuster is adapted to receive the comparison signal from the voltage comparator and to generate a control signal to control an amount of current to draw from the power supply.

Optionally, wherein when the sum voltage is greater than the control voltage, the comparison signal has a first state, and when the sum voltage is lower than the control voltage, the comparison signal has a second state. For instance, the first state may be logic high, and the second state may be logic low.

Optionally, wherein when the comparison signal is in the first state the amount of current to draw is reduced to decrease the input voltage; and when the comparison signal is in the second state the amount of current to draw is increased to increase the input voltage.

Optionally, wherein the adjuster comprises a digital circuit, a register, and a sink current controller.

Optionally, the voltage comparator comprises an offset transistor having the same physical properties as the regulation switch. For instance, the regulation switch and the offset transistor may be transistors having the same type and the same size. For instance, NMOS devices. They may also be manufactured from the batch and the same dye. The offset transistor may be coupled to an input transistor of the voltage comparator.

The offset voltage can remain substantially equal to Vth no matter how process, temperature and ILED vary, making the circuit adaptive to those variations.

According to a second aspect of the disclosure there is provided a driver for driving a semiconductor light source, the driver comprising a regulator circuit according to the first aspect.

Optionally the driver comprises a power supply coupled to the regulator circuit.

For instance, the power supply may be a DC-DC converter such as a switched mode power supply. For example, a buck, a boost or a buck boost converter.

According to a third aspect of the disclosure, there is provided a device comprising a driver according to the second aspect coupled to a semiconductor light source, the driver being adapted to regulate a current flowing through the semiconductor light source; the device further comprising a power supply coupled to the semiconductor light source.

For instance, the device may be a lighting device or a display device.

According to a fourth aspect of the disclosure there is provided a method of operating a regulation switch, the method comprising
  providing a regulation switch having a first terminal coupled to a current source, a second terminal connectable to a load, and a control terminal;
  providing a voltage comparator comprising a predetermined offset voltage;
  comparing, using the voltage comparator, a sum voltage of the offset voltage added to a voltage at the second terminal with the control voltage at the control terminal and generating a comparison signal; and adjusting the voltage at the second terminal based on the comparison signal to control a difference voltage between the control terminal and the second terminal of the regulation switch and to maintain the regulation switch operating in a desired region of operation.

Optionally, the load has an input terminal for receiving an input voltage from a power supply and an output terminal coupled to the regulation switch; and the method comprises varying the input voltage to adjust the voltage at the second terminal.

Optionally, the method comprises controlling an amount of current to draw from the power supply based on the comparison signal.

Optionally, wherein when the sum voltage is greater than the control voltage, the comparison signal has a first state, and when the sum voltage is lower than the control voltage, the comparison signal has a second state.

Optionally, wherein when the comparison signal is in the first state the amount of current to draw is reduced to decrease the input voltage; and when the comparison signal is in the second state the amount of current to draw is increased to increase the input voltage.

Optionally, the regulation switch has a threshold voltage, and the method comprises
  setting the predetermined offset voltage to a value substantially equal to a threshold voltage to operate the regulation switch between a linear region and a saturation region, or
  setting the predetermined offset voltage to a value greater than the threshold voltage of the regulation switch to operate the regulation switch in the linear region or
  setting the predetermined offset voltage to a value lower than the threshold voltage of the regulation switch to operate the regulation switch in the saturation region.

For instance, operating the regulation switch in the saturation region may be used to gain more regulation performance. Operating the regulation switch in the linear region may be used to gain more efficiency. Operating the regulation switch in the between the saturation and the linear regions may be used to obtain a balance between efficiency and regulation performance.

The options described with respect to the first aspect of the disclosure are also common to the second and third and fourth aspects of the disclosure.

DESCRIPTION OF THE DRAWINGS

The disclosure is described in further detail below by way of example and with reference to the accompanying drawings, in which.

DESCRIPTION

Figure 1:
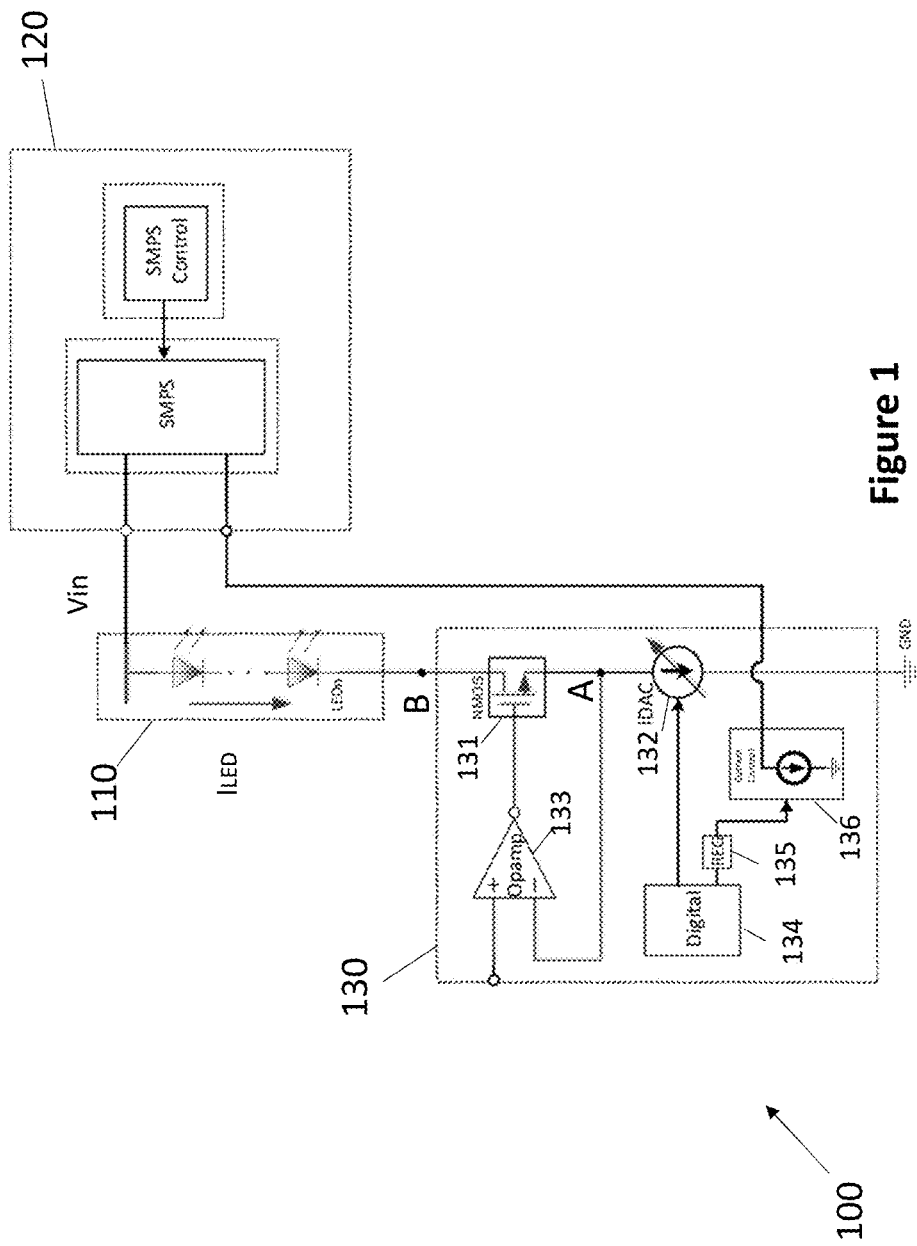
FIG. 1 is a diagram of an LED circuit according to the prior art.

FIG. 1 is a diagram of an LED circuit as described in US2014/0225508. The LED circuit 100 includes an LED string 110, for instance a backlighting unit, a DC-DC switched mode power supply 120 and an LED driver 130. The LED driver includes a regulation switch 131 having a source terminal coupled to a current digital to analog converter IDAC 132c at node A. An operational amplifier 133 is provided to control the gate terminal of the switch 131. The operational amplifier 133 has an inverting terminal coupled to node A, and an output coupled to the gate of the 131. The regulation switch 131 is an NMOS transistor. A digital circuit 134 is provided to control the IDAC 132. The digital circuit 134 is couple to a sink current controller 136 via a register 135. The LED string 110 includes a plurality of LEDs coupled in series. The switch 131 has a drain terminal coupled to the LED string 110 at node B and a source terminal coupled to node A.

In operation, the switched mode power supply 120 generates a DC supply voltage Vin received at an input port of the LED string 110. The supply voltage Vin is function of the number of LED in the LED string 110. The greater the number of LEDs, the greater the voltage Vin. The operational amplifier 133 controls the gate of regulation switch 131 so that a current ILED flowing through the LED string 110 reach its target current value.

The digital circuit 134 sets the register 135 to a suitable value to control the sink current controller 136 to sink a current from the switch-mode power supply. In this way, the supply voltage Vin is boosted to a higher value for a larger number of LEDs. Depending on the application different LED strings of LED arrays may have different number of LEDs. The supply voltage required increases with the number of LEDs. The value of the register 135 is fixed for a certain application, therefore the supply voltage Vin is also fixed. If the current ILED becomes smaller, a voltage is loaded at LED diodes and a redundant voltage is loaded at node B. The power dissipation at node B is poor leading to increase thermal effects and low power efficiency.

Figure 2:
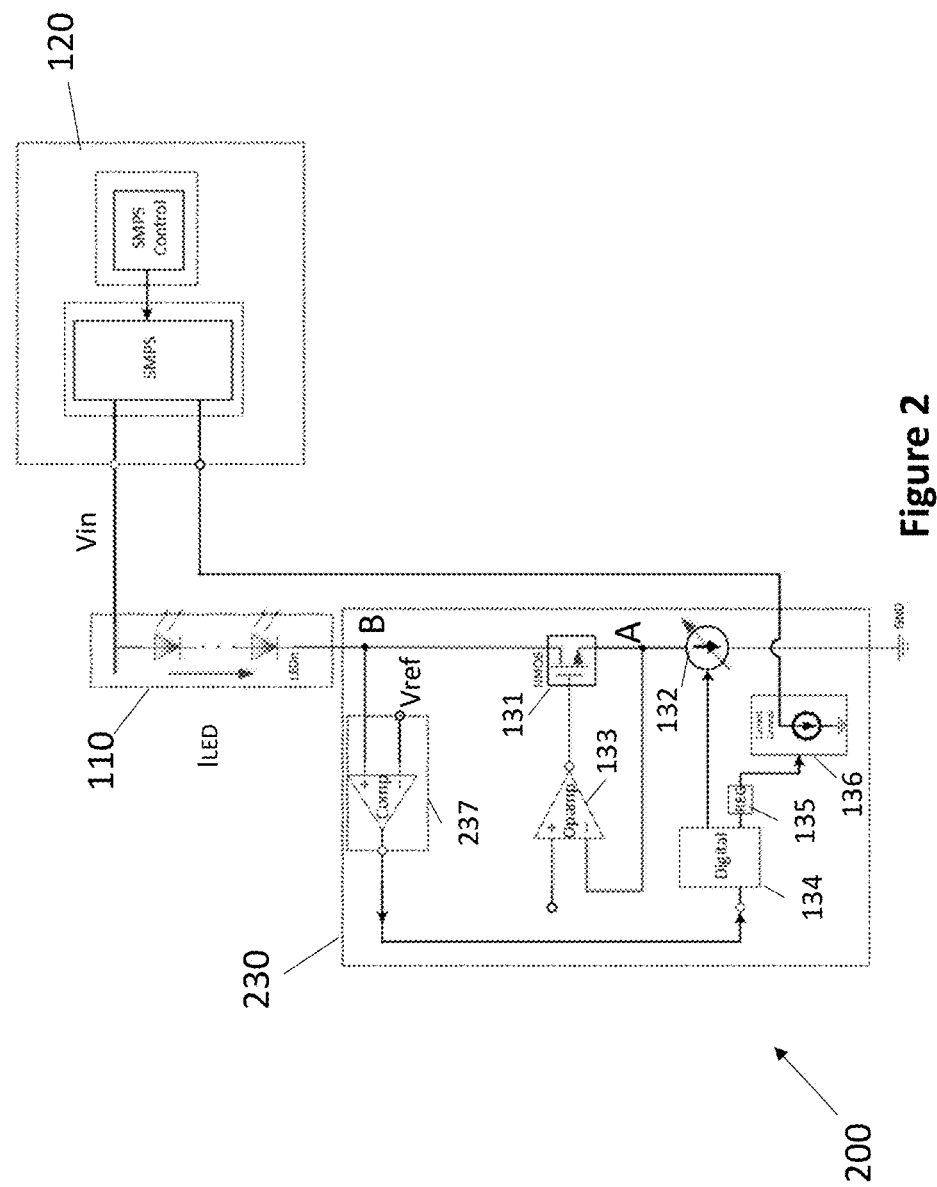
FIG. 2 is a diagram of an LED circuit using a LED driver based on drain sensing.

FIG. 2 is a diagram of an LED circuit using drain sensing. The circuit 200 of FIG. 2 shares similar components to those illustrated in the circuit of FIG. 1. The same reference numerals have been used to represent corresponding components and their description will not be repeated for sake of brevity. To improve power efficiency and solve thermal issue, the driver circuit 230 is modified by the introduction of a sensing comparator 237. The sensing comparator has a non-inverting input coupled to node B, an inverting input receiving a reference voltage Vref, and an output coupled to the digital circuit 134.

In operation the sensing comparator 237 compares the drain voltage of the regulation switch 131 at node B with Vref and provides a feedback signal proportional to VB-Vref to the digital circuit 134. If the drain voltage VB at node B is lower than Vref, the feedback signal is low (logic 0) and the digital circuit 134 sends a signal to the sink current controller 136 to sink more current from the SMPS 120. As a result, the supply voltage Vin will increase.

The sink current controller 136 stops sinking more current when the feedback signal of the sensing comparator 237 flips to logic high. At this point the supply voltage Vin is at a reasonable value, that is safe for operation without excessive thermal effects. Similarly, if the supply voltage Vin is relatively large for a period of time, the sensing comparator 237 will send a feedback signal (logic high when VB>Vref) to the digital circuit 134 to lower Vin until the output of the sensing comparator flips to logic low.

This sensing method achieves real-time sensing but still has several limitations. Using this approach, the drain of the NMOS switch is adjusted to equal Vref no matter what the process corner of the NMOS, the temperature and the current ILED are. Consequently, it is difficult to adjust the supply voltage Vin to a suitable value at all conditions. The power efficiency can only be optimum in some specific conditions. For example, if Vref equals 520 mV, it may be an optimal value when ILED is 30 mA. But when the current ILED changes to a smaller value, the drain to source voltage Vds of the NMOS is relatively large for this ILED and the power efficiency is therefore relatively low.

Figure 3:
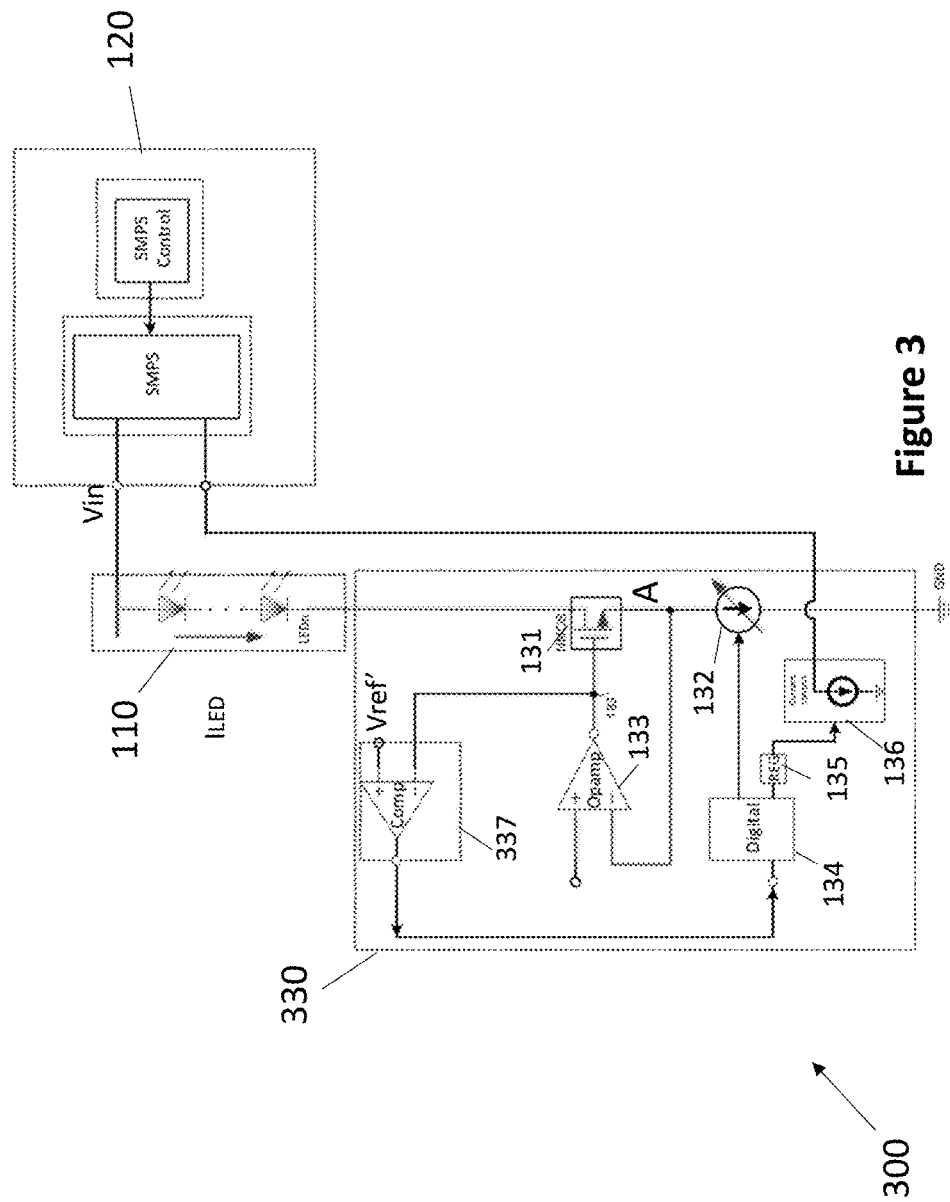
FIG. 3 is a diagram of an LED circuit using an LED driver based on gate sensing.

FIG. 3 is a diagram of another LED circuit according as described in U.S. Pat. No. 8,710,752. The circuit 300 of FIG. 3 shares similar components to those illustrated in the circuit of FIG. 2. The same reference numerals have been used to represent corresponding components and their description will not be repeated for sake of brevity.

For improving power efficiency further, the driver circuit 330 includes a modified sensing comparator 337. The sensing comparator 337 has a non-inverting input coupled to a reference voltage Vref', an inverting input coupled to the gate of the regulation switch 131, and an output coupled to the digital circuit 134. The reference voltage Vref' may be set to a high value for satisfying all process corners and improving power efficiency. The regulation switch is therefore operated in deep linear region. As a result, the ripple of the supply voltage Vin will affect the current ILED to a greater extent.

Figure 4:
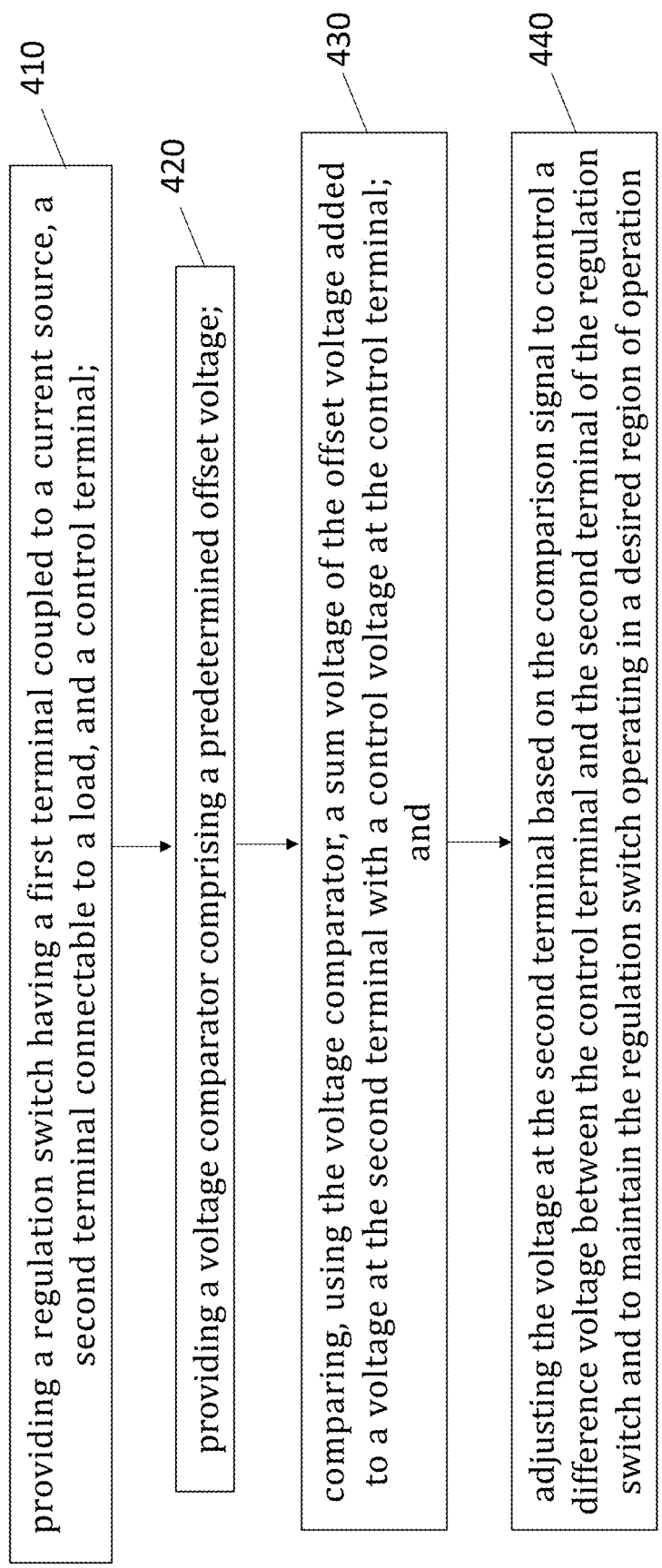
FIG. 4 is a flow chart of a method for operating a regulation switch according to the disclosure.

FIG. 4 is a flow chart of a method for operating a regulation switch according to the disclosure.

At step 410 a regulation switch is provided. The regulation switch has a first terminal coupled to a current source, a second terminal connectable to a load, and a control terminal. For instance, the load may have an input terminal for receiving an input voltage and an output terminal coupled to the regulation switch. At step 420 a voltage comparator comprising a predetermined offset voltage is provided. At step 430 the voltage regulator with offset voltage is used to compare a sum voltage of the offset voltage added to a voltage at the second terminal with the control voltage at the control terminal; and a comparison signal is generated. At step 440 the voltage at the second terminal is adjusted based on the comparison signal to control a difference voltage between the control terminal and the second terminal of the regulation switch and to maintain the regulation switch operating in a desired region of operation.

The regulation switch has a threshold voltage Vth. The method may further include the step of setting the predetermined offset voltage to a specific value. The predetermined offset voltage may be set to a value substantially equal to Vth to operate the regulation switch between a linear region and a saturation region. The predetermined offset voltage may be set to a value greater than Vth to operate the regulation switch in the linear region. The predetermined offset voltage may be set to a value lower than Vth to operate the regulation switch in the saturation region.

The comparison signal may be used to adjust the input voltage provided by the power supply. This may be achieved by drawing or sinking an amount of current of the power supply.

When the sum voltage is greater than the control voltage, the comparison signal has a first state for instance a logic high, and when the sum voltage is lower than the control voltage, the comparison signal has a second state, for instance a logic low.

When the comparison signal is in the first state (logic high) an amount of current to be drawn or sunk is reduced to decrease the input voltage. Conversely, when the comparison signal is in the second state (logic low) the amount of current to be drawn or sunk is increased to increase the input voltage.

The regulation switch may be a metal-oxide-semiconductor field-effect (MOSFET) transistors, such as N type MOSFET or NMOS. For NMOS transistors, different gate-source voltages (Vgs) and drain-source voltages (Vds) can be used so that the NMOS transistor operates in the linear region or the saturation region of operation.

The boundary between the linear and the saturation regions is given by:

$$Vds = Vgs - Vth \quad [1]$$

in which Vth or Vgs(th), is the threshold voltage of the regulation switch. The threshold voltage of a field-effect transistor (FET) is the minimum gate-to-source voltage (Vgs) that is needed to create a conducting path between the source and drain terminals.

If Vds>Vgs−Vth, the NMOS transistor will enter the saturation region of operation. Conversely, if Vds<Vgs−Vth, the NMOS transistor will enter the linear region of operation. Equation [1] can also be expressed by:

$$Vd - Vs = Vg - Vs - Vth \quad [2]$$

$$Vg - Vd = Vth \quad [3]$$

Consequently, Vg−Vd=Vth will also define the boundary between the linear region and the saturation region.

By controlling the value of the gate to drain voltage Vgd, the NMOS transistor can enter different regions. Besides, if Vgd is approximately equal to Vth regardless of the temperature or of the current ILED, then the NMOS transistor will remain at the edge of the saturation region all the time.

Figure 5A:
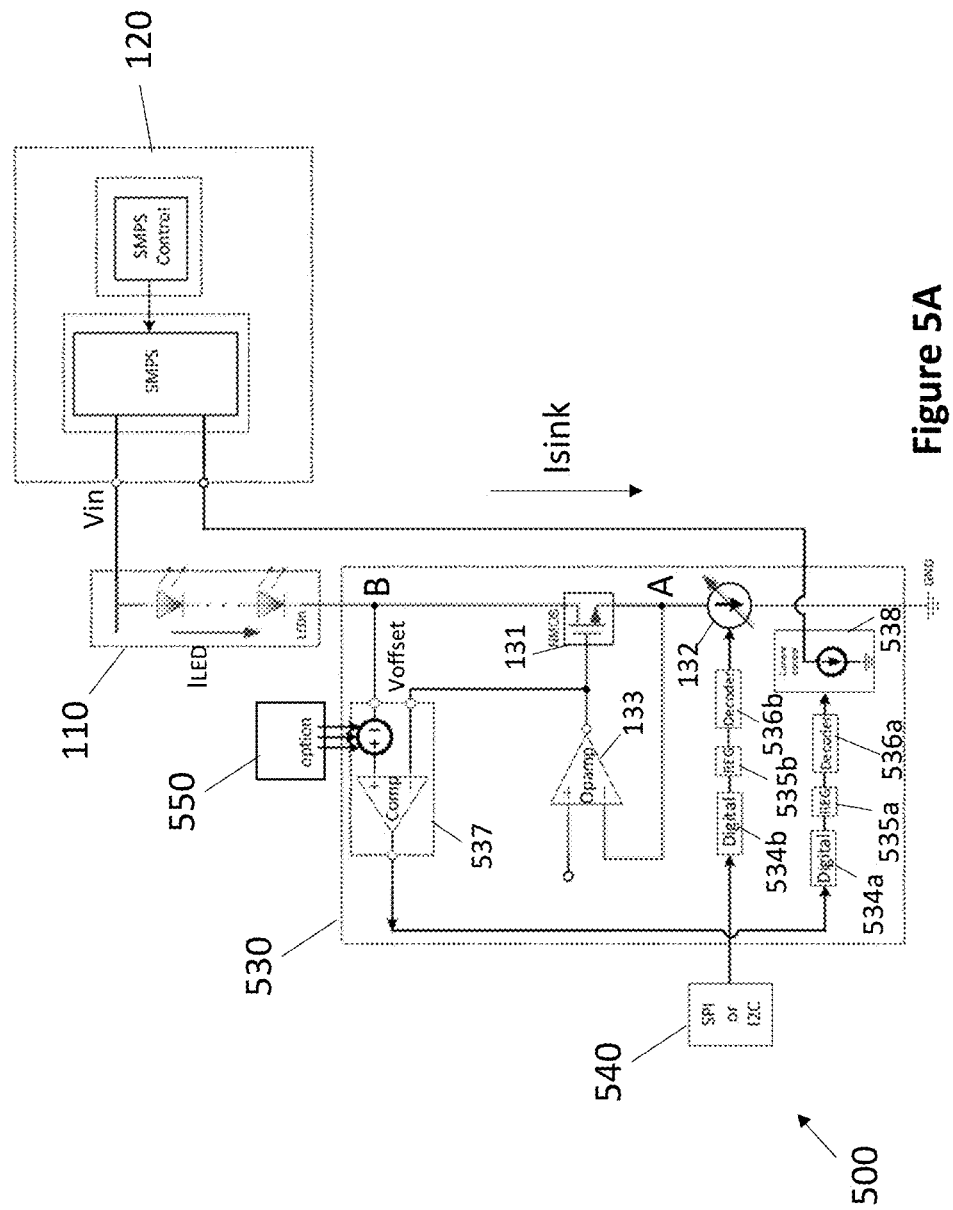
FIG. 5A is a diagram of an LED circuit according to the disclosure.

FIG. 5A is a diagram of an LED circuit according to the disclosure. The circuit 500 shares similar components to those illustrated in the circuit of FIG. 3. The same reference numerals have been used to represent corresponding components and their description will not be repeated for sake of brevity. The LED circuit 500 includes an LED string 110, for instance a backlighting unit, a DC-DC switched mode power supply 120 and a current regulator 530 for implementing the method of FIG. 4.

In this example the current regulator 530 is used to regulate the current ILED through the LED string 110 and may be referred to as an LED driver. The current regulator 530 includes a regulation switch 131, a voltage comparator with input offset voltage 537 and an adjuster adapted to control a region of operation of the regulation switch based on the comparison signal.

The adjuster includes a first digital circuit 534a, coupled to the sink current controller 538 via a register 535a and a decoder 536a. A second digital circuit 534b is provided to control the IDAC 132 via a second register 535b and a second decoder 536b. A communication device 540 is coupled to the second digital circuit 534b to select how much LED current is required. For instance, the communication device 540 may communicate information to the digital circuit 534b using the Inter-Integrated Circuit (I2C) protocol, or the Serial Peripheral interface (SPI) protocol. For example, the current source 132 may be set to 30 mA or 10 mA by the device 540.

In this example the regulation switch 131 is implemented as a NMOS transistor. The regulation switch 131 has a source terminal coupled to the current source 132, a drain terminal connectable to the LED string or LED array 110, and a gate terminal coupled to Opamp 133.

The voltage comparator with input offset voltage 537 has a non-inverting input provided with an offset voltage Voffset coupled to the second terminal (drain) of the regulation switch at node B, an inverting input coupled to the control terminal (gate) of the regulation switch 131, and an output coupled to the digital circuit 534a. An offset voltage adjuster 550 may be provided to set the offset voltage Voffset to a desired value. For instance, Voffset may be set to a value equal to Vth, or greater than Vth, or less than Vth.

Figure 5B:
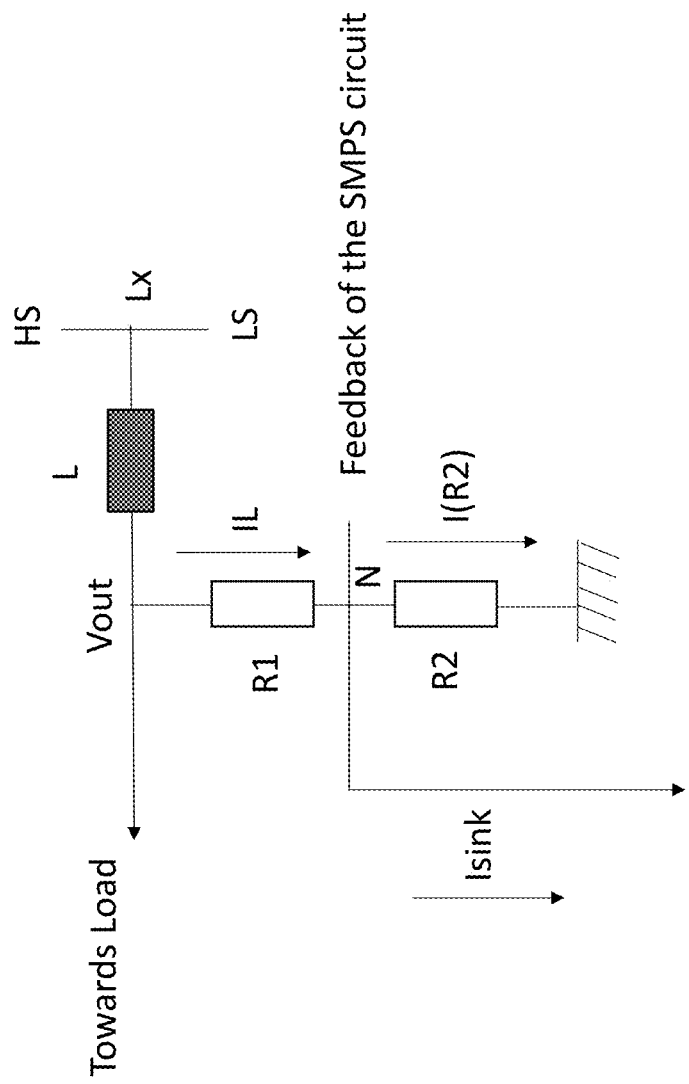
FIG. 5B is a schematic diagram of an output stage of a switched mode power supply used in FIG. 5A.

FIG. 5B is a schematic diagram of the output stage of the SMPS. For simplicity and clarity other parts of the SMPS circuit have been omitted. The SMPS has an inductor L coupled to a high side switch HS and a low side switch LS at a switching node LX. A resistance divider is provided at the output by resistances R1 and R2 coupled at node N. The sink current controller 538 is coupled to the SMPS 120 at node N. The voltage VN at node N is fixed and the inductor current is equal to the sum of the sink current Isink and the current through R2. The supply voltage (labelled here Vout but shown as Vin in FIG. 5A) provided by the SMPS is equal to Vout=(R1+R2)/R2*VN if Isink is null. As Isink increases Vout increases.

In operation, the OPamp 133 may be used to control the voltage VA at node A so that VA remains constant via the feedback loop. The voltage comparator with input offset voltage 537 compares the sum of the offset voltage Voffset and the voltage VB at node B with the gate voltage Vg at the control terminal, and generates a comparison signal proportional to the difference voltage. The offset voltage may be set to be equal or substantially equal to the threshold voltage Vth of the regulation switch 131.

If VB+Voffset>Vg then the comparator 537 outputs a comparator signal having a high value (logic 1). If VB+Voffset<Vg then the comparator 537 outputs a comparator signal having a low value (logic 0).

The comparator/feedback signal is received by the digital circuit 534a to control the amount of current that should be sunk from the SMPS 120. When the comparator/feedback signal is low (logic 0) the digital circuit 534a sends a signal to the sink current controller 538 to sink more current from the SMPS 120. As a result, the supply voltage Vin will increase until the feedback signal flips its value to logic 1. As Vin increases, the voltage VB also increases to keep the gate to drain voltage Vgd at the desired value. Similarly, when the comparator/feedback signal is high (logic 1) the digital circuit 534a sends a signal to the sink current controller 538 to sink less current from the SMPS 120. As a result, the supply voltage Vin will decrease until the feedback signal flips its value to logic 0. As Vin decreases, the voltage VB also decreases to keep the gate to drain voltage Vgd at the desired value. The digital block 534a can therefore adjust the sink current iteratively.

As a result, the regulation switch 131 is maintained in the desired region of operation. For instance, if Voffset is set equal or substantially equal to the threshold voltage Vth of the regulation switch 131, then the regulation switch 131 operates between the linear region and the saturation region.

More generally, the comparator signal is used to dynamically adjust the LED supply voltage and keep the regulation switch operating in the desired region. For example, one can keep the regulation switch operating in the saturation region to gain more regulation performance. Otherwise, one can keep the regulation switch operating in linear region to gain more efficiency. Alternatively, one can keep the regulation switch operating at saturation/linear boundary to achieve a balance between efficiency and regulation performance.

Compared with the circuit 200 of FIG. 2 based on drain voltage sensing, the circuit 500 has better power efficiency. This is because in the circuit 200 the NMOS transistor operates in the excess saturation region, especially for a small ILED current.

Compared with the circuit 300 of FIG. 3 based on gate voltage sensing, the circuit 500 has a better transient line regulation and the power supply rejection ratio (PSRR) of the driver is higher. This is because in the circuit 300 the NMOS transistor operates in the deep linear region.

The circuit 500 also permits to adjust adaptively the gate to drain voltage Vgd of the regulation switch, so the supply voltage Vin can be at an appropriate value at all times, regardless the variations in temperature or in the value of ILED.

Figure 11:
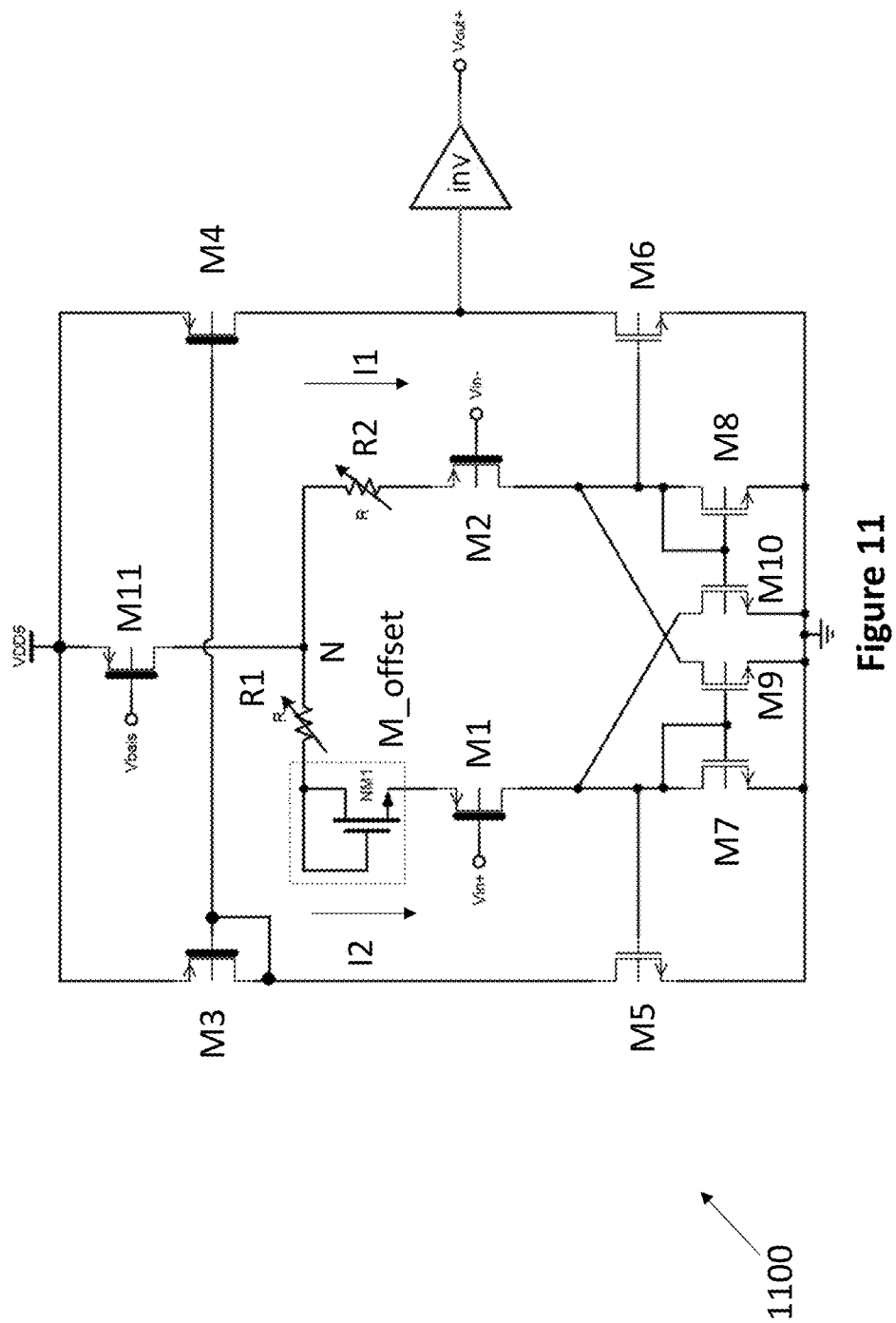
FIG. 11 is an exemplary embodiment of a voltage comparator with input offset voltage for use in the circuit of FIG. 5.
Figure 12:
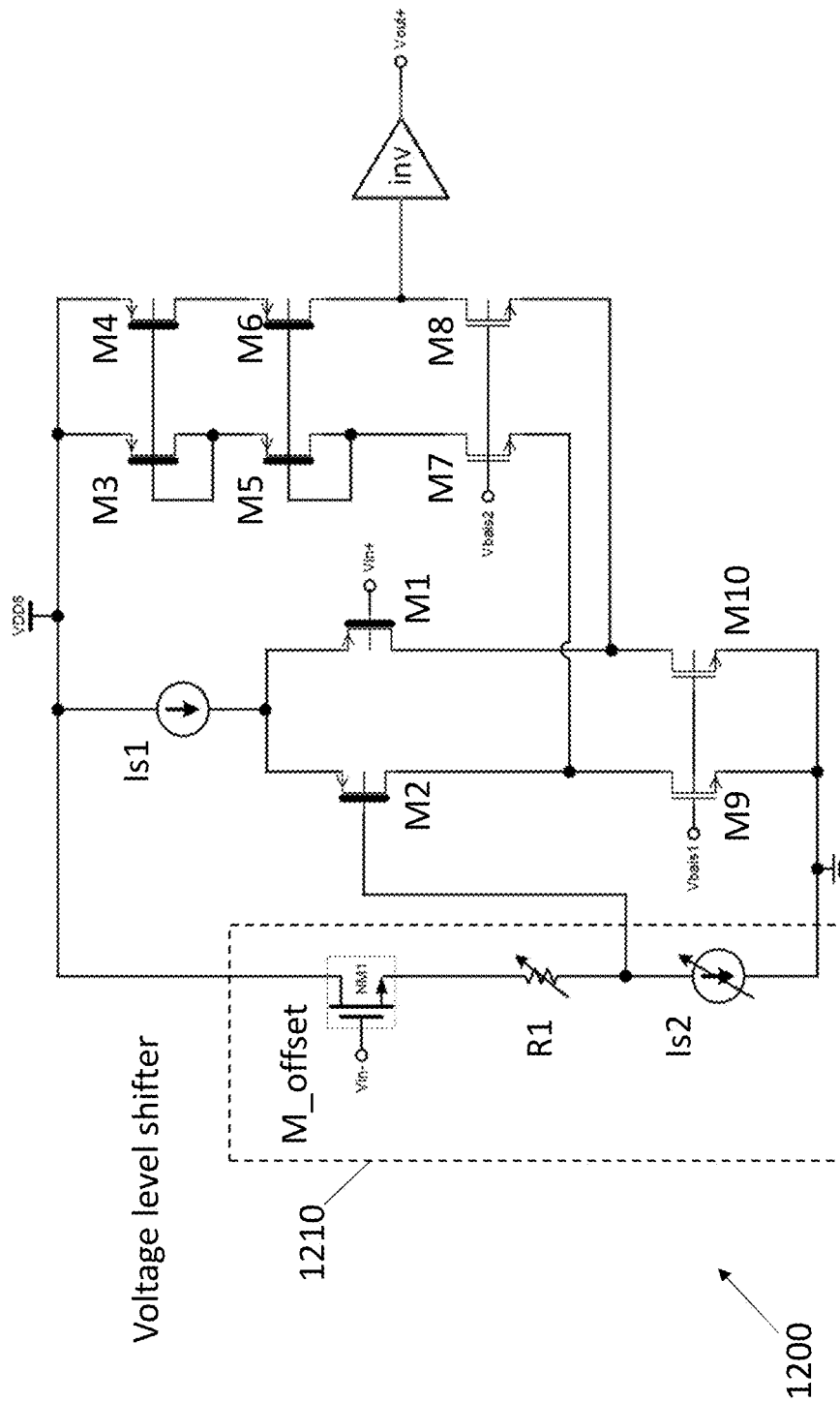
FIG. 12 is another exemplary embodiment of a voltage comparator with input offset voltage for use in the circuit of FIG. 5.

As mentioned above the offset voltage Voffset may be chosen to be equal to Vth. Since the threshold voltage Vth changes along with different process corners, the offset voltage of the comparator 537 also changes accordingly so that the regulation switch 131 is always adjusted at suitable region regardless of process corners. FIGS. 11 and 12 describe example topologies of voltage comparators with offset voltage that may be used in the circuit of FIG. 5.

Figure 6:
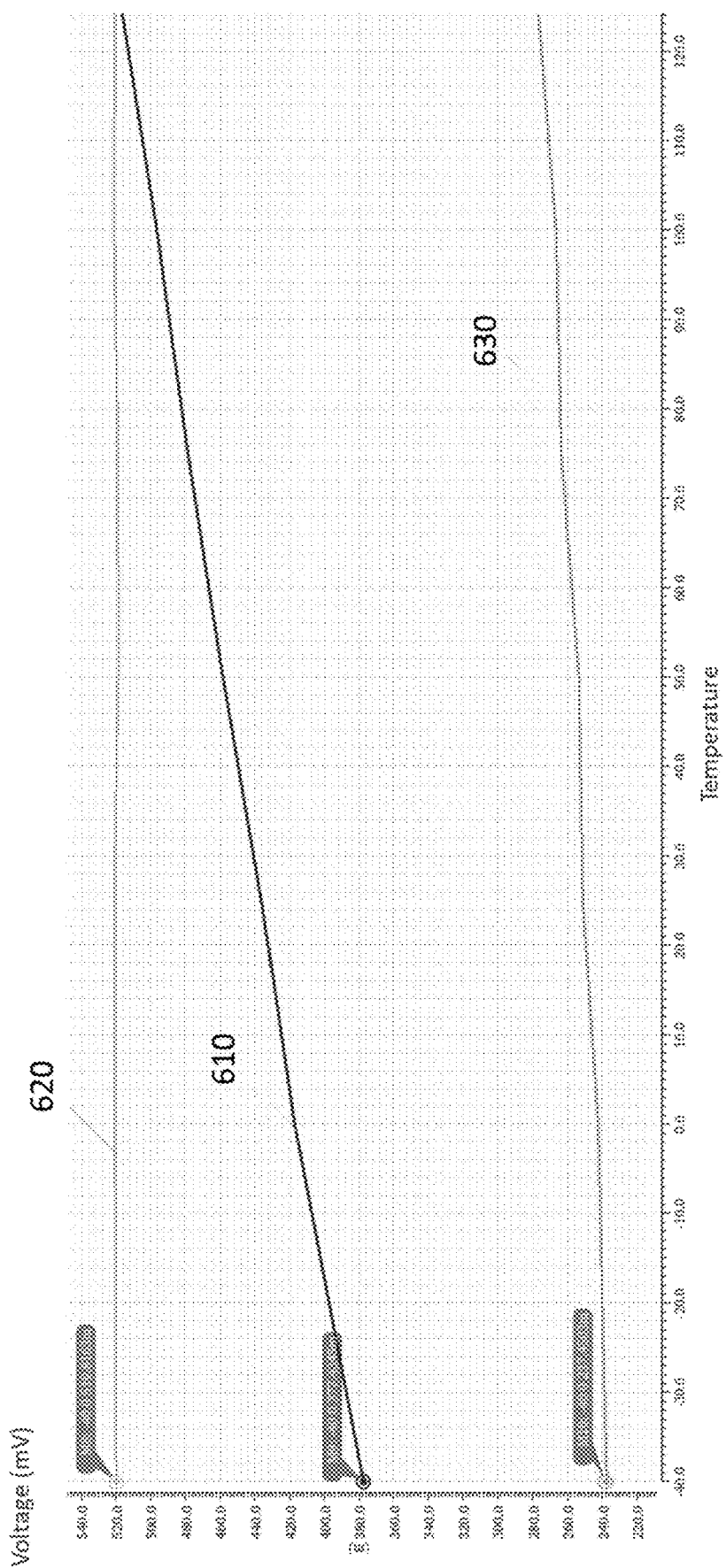
FIG. 6 is a simulation of the drain voltage of the regulation switch as a function of temperature obtained for the circuits of FIGS. 2, 3 and 5.

FIG. 6 is a simulation showing the drain voltage of the regulation switch as a function of temperature for various circuits. The waveform 610 shows the drain voltage obtained with the driver 530 of FIG. 5 (gate-drain difference voltage sensing). The waveform 620 shows the drain voltage obtained with the driver 230 of FIG. 2 (drain voltage sensing). The waveform 630 shows the drain voltage obtained with the driver 330 of FIG. 3 (gate voltage sensing). Using the driver 530, the drain voltage 610 can be adjusted adaptively under different temperature.

Figure 7:
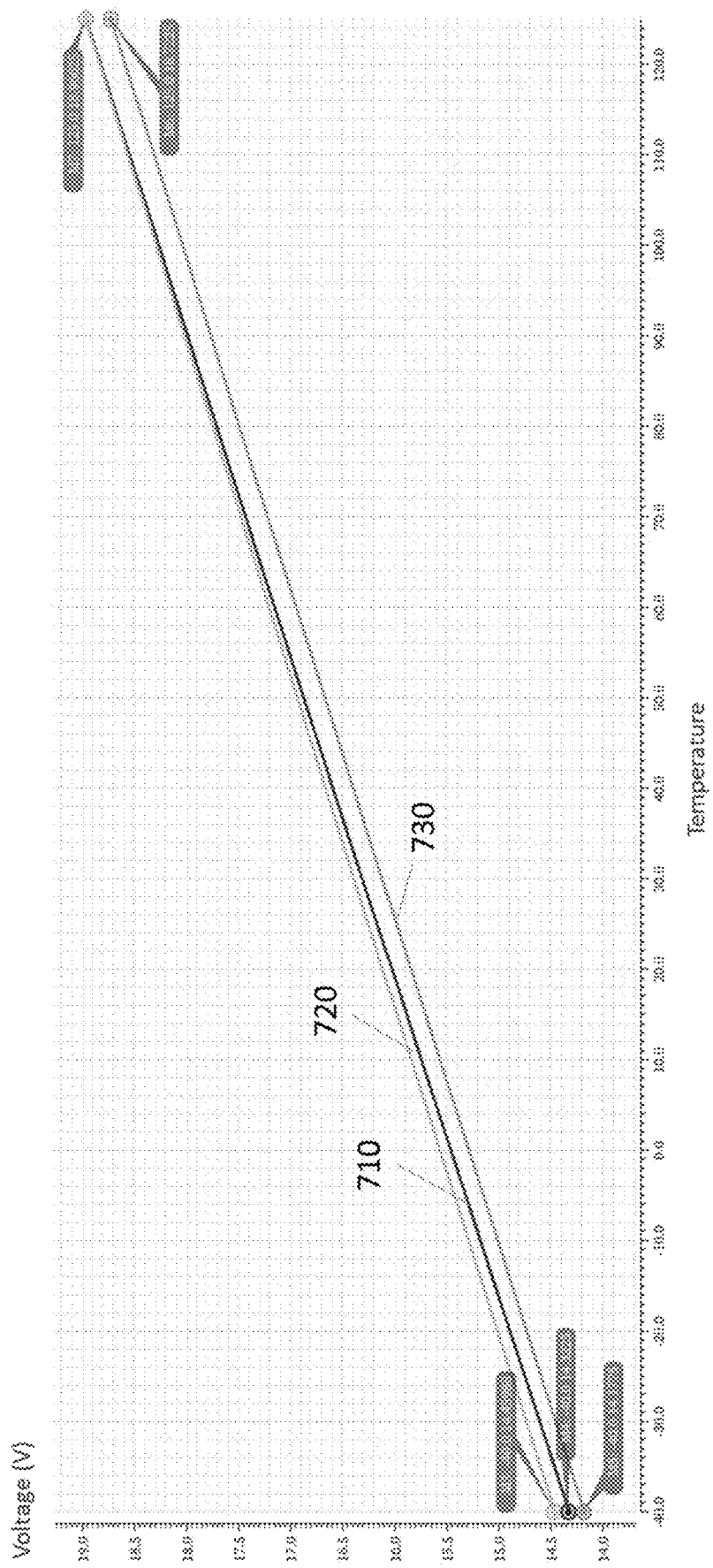
FIG. 7 is a simulation of the supply voltage as a function of temperature at fixed LED current obtained for the circuits of FIGS. 2, 3 and 5.

FIG. 7 is a simulation showing the DC-DC supply voltage Vin as a function of temperature for an LED current ILED=30 mA. The waveform 710 shows the voltage Vin obtained with the circuit 500 of FIG. 5 (gate-drain difference voltage sensing). The waveform 720 shows Vin obtained with the circuit 200 of FIG. 2 (drain voltage sensing). The waveform 730 shows Vin obtained with the circuit 300 of FIG. 3 (gate voltage sensing). For the circuit 500 the DC-DC supply voltage Vin 710 is between the Vin 720 and Vin 730 when temperature is changing.

Figure 8:
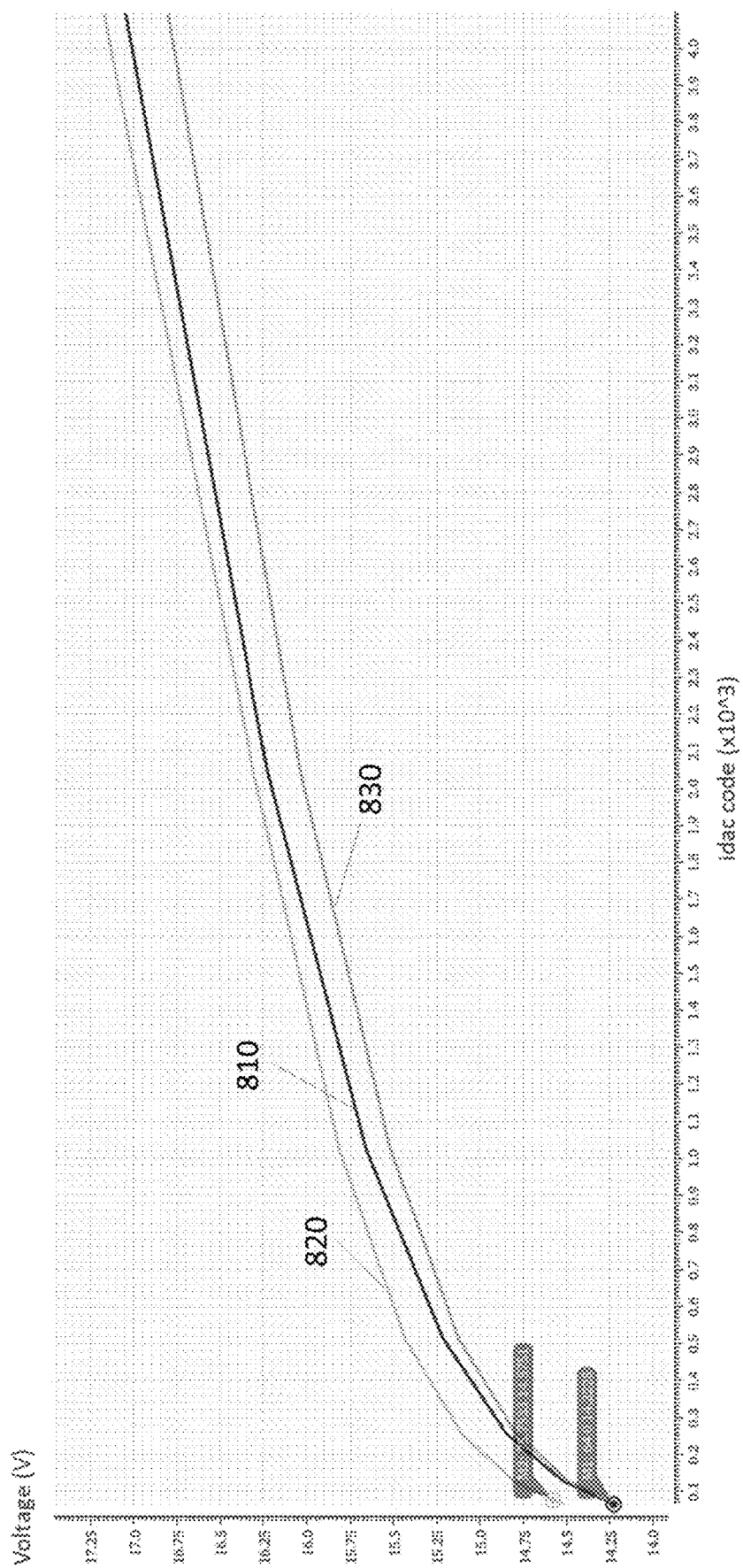
FIG. 8 is a simulation of the supply voltage as a function of the LED current at fixed temperature obtained for the circuits of FIGS. 2, 3 and 5.

FIG. 8 is a simulation showing the DC-DC supply voltage Vin as a function of ILED (from 1 mA to 60 mA) at a temperature of 27 deg. The x-axis indicates the digital code of the current DAC (idac). A digital code of 68 corresponds to 1 mA, while a code of 4095 corresponds to 60 mA. The waveform 810 shows the voltage Vin obtained with the driver 530 of FIG. 5 (gate-drain difference voltage sensing). The waveform 820 shows Vin obtained with the driver 230 of FIG. 2 (drain voltage sensing). The waveform 730 shows Vin obtained with the driver 330 of FIG. 3 (gate voltage sensing). The DC-DC supply voltage Vin 810 is between Vin 820 and Vin 830 when ILED is changing.

Figure 9:
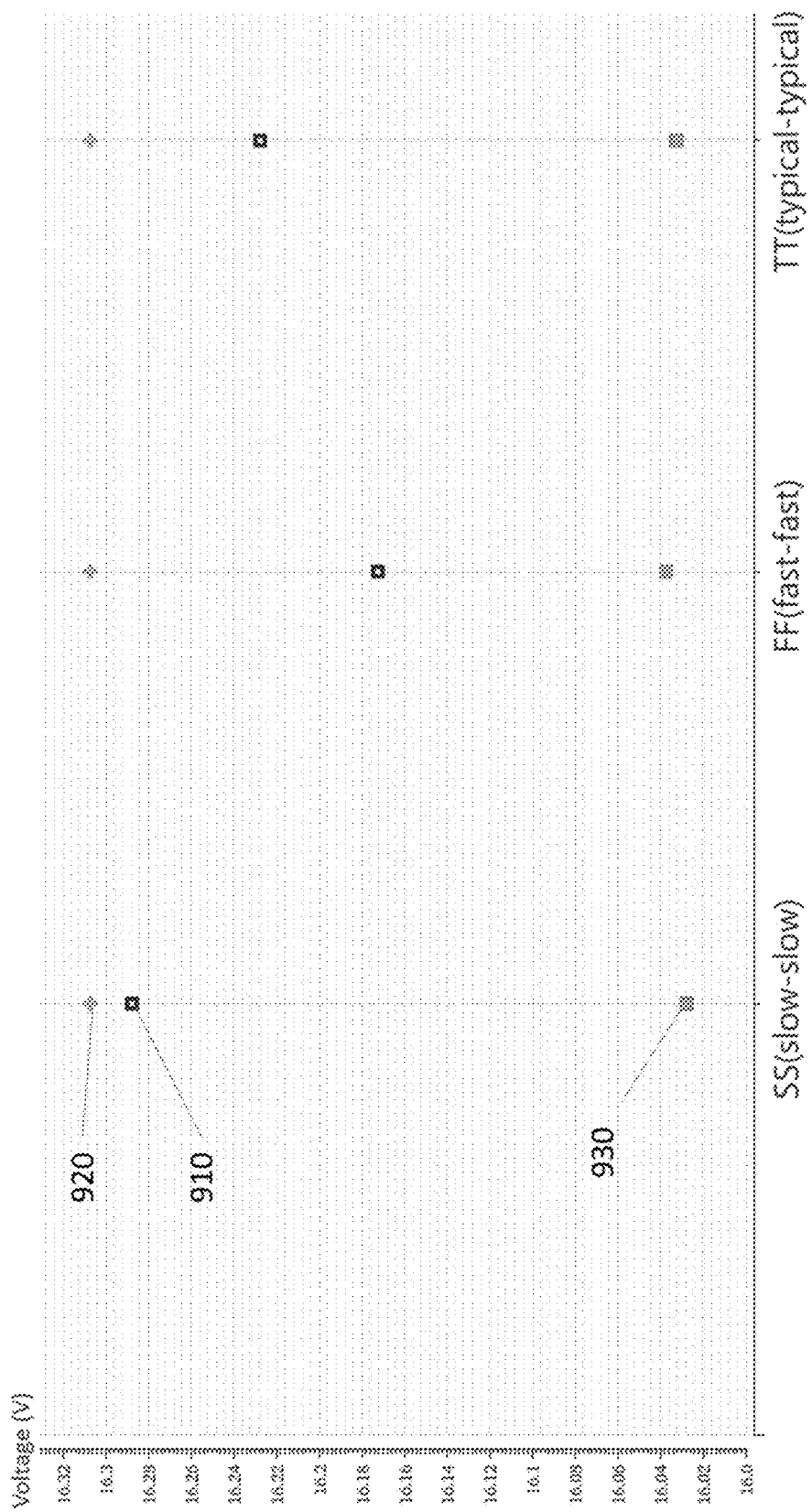
FIG. 9 is a simulation of the supply voltage as a function of process corners at fixed LED current and temperature.

FIG. 9 is a simulation showing the DC-DC supply voltage Vin as a function of process corners at ILED=30 mA and Temperature=27 deg. Three process corners are represented: SS(slow-slow), FF(fast-fast) and TT(typical-typical), in which by convention the first letter refers to the N-channel MOSFET (NMOS) corner, and the second letter refers to the P channel (PMOS) corner. The hollow squares labelled 910 show the voltage Vin obtained with the driver 530 of FIG. 5 (gate-drain difference voltage sensing). The crosses labelled 920 show Vin obtained with the driver 230 of FIG. 2 (drain voltage sensing). The squares 930 show Vin obtained with the driver 330 of FIG. 3 (gate voltage sensing). The DC-DC supply voltage Vin can be adjusted dynamically according to different process corners. Besides, the DC-DC supply voltage Vin 910 is between Vin 920 and Vin 930 for different corners.

Figure 10:
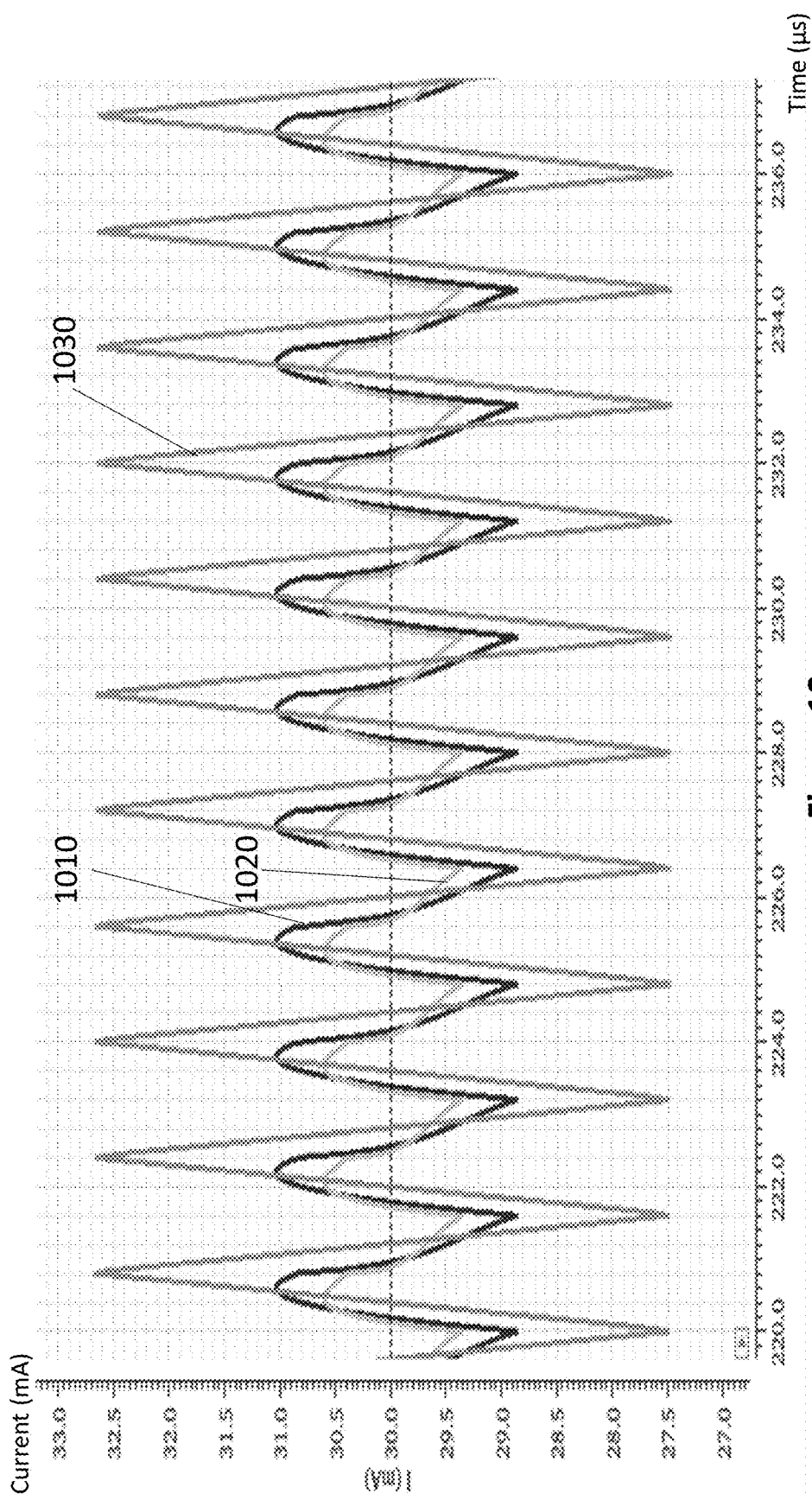
FIG. 10 is a simulation of the current flowing through the LEDs as a function of time obtained for the circuits of FIGS. 2, 3 and 5.

FIG. 10 is a simulation showing the current ILED flowing through the LEDs as a function of time (transient line regulation) obtained when the DC-DC supply Vin has high frequency ripples. The waveform 1010 shows the current ILED obtained with the circuit 500 of FIG. 5 (gate-drain difference voltage sensing). The waveform 1020 shows the current ILED obtained with the circuit 200 of FIG. 2 (drain voltage sensing). The waveform 1030 shows the current ILED obtained with the circuit 300 of FIG. 3 (gate voltage sensing). The transient line regulation simulations are obtained for ILED=30 mA (@peak to peak ripple of DC-DC supply voltage is 200 mV @625 kHz). The gate voltage sensing circuit 300 has worse transient line regulation, compared with the circuit 500 and the drain voltage sensing circuit 200.

FIGS. 7, 8 and 9 show that the DC-DC supply voltage Vin is lower for the proposed circuit 500 compared with the circuit 200. Therefore, the proposed approach has a better power efficiency compared with the drain sensing circuit 200. FIG. 10 shows that circuit 500 has better transient line regulation compared with the gate voltage sensing circuit 300. Overall, the circuit 500 can realize a good trade-off between power efficiency and transient line regulation. Besides, the drain voltage VB=Vd and the DC-DC supply voltage Vin of circuit 500 are adjusted adaptively to satisfy different process corner, ILED and temperature variations.

FIG. 11 is an exemplary embodiment of a voltage comparator with input offset voltage for use in the circuit of FIG. 5. The topology of the hysteresis comparator 1100 includes 11 transistors labelled M1-M11, an additional offset transistor labelled M_offset, and two variable resistances labelled R1 and R2.

The transistor M_offset is chosen to be the same as the regulation switch 131 of FIG. 5; in the present example a same NMOS transistor. Therefore, with a same threshold voltage Vth. The transistors M1 and M2 are provided at the non-inverting, and inverting inputs, respectively. A first path couples M1 to a rail voltage Vdd via M_offset, R1 and M11. A second path couples M2 to the rail voltage Vdd via R2 and M11.

The transistor M_offset is diode-connected, that is in the present example the gate and drain of the NMOS are connected together. The offset voltage Voffset equals the gate to source voltage Vgs of the M_offset transistor. Voffset can be set to a desired value (for instance Vth) by adjusting either the bias voltage Vbias of the switch M11 and/or a value of the variable resistances R1 and/or the variable resistance R2. For instance changing Vbias (M11) changes Ids (M11) which in turn changes Vgs(Moffset). Similarly, if R1 increases, the voltage between the source of M_offset and node N increases. The offset voltage adjuster 550 can be used to adjust any of the parameters R1, R2 and Vbias. Diode-connected transistors can also be achieved with BJT by connecting the base and collector; and with JFET by connecting the drain and the source.

FIG. 12 is another exemplary embodiment of a voltage comparator with input offset voltage for use in the circuit of FIG. 5. The topology of the comparator 1200 includes 10 transistors labelled M1-M10, an additional offset transistor labelled M_offset, a variable resistances R1 and a current source Is1 and a variable current source Is2.

The transistor M_offset, the variable resistance R1 and the variable current source Is2 form a voltage level shifter also referred to as first stage 1210. The second stage formed by the remaining components is comparator to input error. Like in FIG. 11 the transistor M_offset is chosen to be the same as the regulation switch 131 of FIG. 5; in the present example a same NMOS transistor. The transistors M1 is provided at the non-inverting input, while the transistor M_offset is provided as a source follower at the inverting input. The difference voltage V+/− between the non-inverting input and the inverting input is V+/−=Vgs(Moffset)+VR1. The voltage VR1 across R1 can be adjusted either by changing R1 and/or the current provided by the variable current source IS2. The offset voltage adjuster 550 can be used to adjust any of the parameters R1 or the current of IS2. In operation the M_offset transistor provides an offset voltage equal to the desired value, for instance Vth of the regulation switch 131.

It will be appreciated that other comparator topologies providing an adjustable offset voltage could be used in the circuit 500 to provide the gate-drain difference voltage adaptive sensing functionality.

A skilled person will therefore appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

The invention claimed is:

1. A regulator circuit comprising
  a regulation switch having a first terminal coupled to a current source, a second terminal connectable to a load, and a control terminal;
  a voltage comparator comprising a predetermined offset voltage, the voltage comparator being adapted to compare a sum voltage of the offset voltage added to a voltage at the second terminal with a control voltage at the control terminal, and to generate a comparison signal; and
  an adjuster adapted to adjust the voltage at the second terminal based on the comparison signal to control a difference voltage between the control terminal and the second terminal of the regulation switch and to maintain the regulation switch operating in a desired region of operation.

2. The regulator circuit as claimed in claim 1, wherein the predetermined offset voltage is adjustable.

3. The regulator circuit as claimed in claim 1, wherein the predetermined offset voltage is equal or substantially equal to a threshold voltage of the regulation switch to operate the regulation switch between a linear region and a saturation region, or
wherein the predetermined offset voltage is greater than the threshold voltage of the regulation switch to operate the regulation switch in the linear region or
wherein the predetermined offset voltage is lower than the threshold voltage of the regulation switch to operate the regulation switch in the saturation region.

4. The regulator circuit as claimed in claim 1, wherein the difference voltage is substantially equal to the offset voltage.

5. The regulator circuit as claimed in claim 1, wherein the load has an input terminal for receiving an input voltage from a power supply and an output terminal coupled to the regulation switch; and wherein the adjuster is adapted to adjust the voltage at the second terminal by varying the input voltage.

6. The regulator circuit as claimed in claim 5, wherein the adjuster is adapted to receive the comparison signal from the voltage comparator and to generate a control signal to control an amount of current to draw from the power supply.

7. The current regulator as claimed in claim 6, wherein when the sum voltage is greater than the control voltage, the comparison signal has a first state, and when the sum voltage is lower than the control voltage, the comparison signal has a second state.

8. The current regulator as claimed in claim 7, wherein when the comparison signal is in the first state the amount of current to draw is reduced to decrease the input voltage; and when the comparison signal is in the second state the amount of current to draw is increased to increase the input voltage.

9. The current regulator as claimed in claim 1, wherein the adjuster comprises a digital circuit, a register, and a sink current controller.

10. The current regulator as claimed in claim 1, wherein the voltage comparator comprises an offset transistor having the same physical properties as the regulation switch.

11. A driver for driving a semiconductor light source, the driver comprising a regulator circuit as claimed in claim 1.

12. The driver as claimed in claim 11 further comprising a power supply coupled to the regulator circuit.

13. A device comprising a driver as claimed in claim 11 coupled to a semiconductor light source, the driver being adapted to regulate a current flowing through the semiconductor light source; the device further comprising a power supply coupled to the semiconductor light source.

14. A method of operating a regulation switch, the method comprising providing a regulation switch having a first terminal coupled to a current source, a second terminal connectable to a load, and a control terminal;
providing a voltage comparator comprising a predetermined offset voltage;
comparing, using the voltage comparator, a sum voltage of the offset voltage added to a voltage at the second terminal with the control voltage at the control terminal and generating a comparison signal; and
adjusting the voltage at the second terminal based on the comparison signal to control a difference voltage between the control terminal and the second terminal of the regulation switch and to maintain the regulation switch operating in a desired region of operation.

15. The method as claimed in claim 14, wherein the load has an input terminal for receiving an input voltage from a power supply and an output terminal coupled to the regulation switch; and the method comprises varying the input voltage to adjust the voltage at the second terminal.

16. The method as claimed in claim 15, comprising controlling an amount of current to draw from the power supply based on the comparison signal.

17. The method as claimed in claim 16, wherein when the sum voltage is greater than the control voltage, the comparison signal has a first state, and when the sum voltage is lower than the control voltage, the comparison signal has a second state.

18. The method as claimed in claim 17, wherein when the comparison signal is in the first state the amount of current to draw is reduced to decrease the input voltage; and when the comparison signal is in the second state the amount of current to draw is increased to increase the input voltage.

19. The method as claimed in claim 14, wherein the regulation switch has a threshold voltage, the method comprising
setting the predetermined offset voltage to a value substantially equal to a threshold voltage to operate the regulation switch between a linear region and a saturation region, or
setting the predetermined offset voltage to a value greater than the threshold voltage of the regulation switch to operate the regulation switch in the linear region, or
setting the predetermined offset voltage to a value lower than the threshold voltage of the regulation switch to operate the regulation switch in the saturation region.

* * * * *